US012069034B2

(12) United States Patent
Walters et al.

(10) Patent No.: US 12,069,034 B2
(45) Date of Patent: *Aug. 20, 2024

(54) SYSTEM, METHOD, AND COMPUTER-ACCESSIBLE MEDIUM FOR HIDING MESSAGES SENT TO THIRD PARTIES

(71) Applicant: Capital One Services, LLC, McLean, VA (US)

(72) Inventors: Austin Walters, Savoy, IL (US); Vincent Pham, Champaign, IL (US); Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,502

(22) Filed: Jul. 24, 2023

(65) Prior Publication Data

US 2024/0031342 A1   Jan. 25, 2024

Related U.S. Application Data

(63) Continuation of application No. 16/991,919, filed on Aug. 12, 2020, now Pat. No. 11,750,572.

(51) Int. Cl.
*H04L 29/06* (2006.01)
*H04L 9/06* (2006.01)
*H04L 9/08* (2006.01)
*H04L 9/40* (2022.01)
*H04L 51/04* (2022.01)
*H04L 51/212* (2022.01)

(52) U.S. Cl.
CPC ........ *H04L 63/0428* (2013.01); *H04L 9/0643* (2013.01); *H04L 9/0819* (2013.01); *H04L 51/04* (2013.01); *H04L 51/212* (2022.05)

(58) Field of Classification Search
USPC ........................................................ 713/170
See application file for complete search history.

(56) References Cited

U.S. PATENT DOCUMENTS 6,061,448 A    5/2000  Smith et al.
6,367,010 B1   4/2002  Venkatram et al.
6,651,166 B1   11/2003 Smith et al.
(Continued)

FOREIGN PATENT DOCUMENTS

CA    2412348 A1   5/2003
CA    2256881 C    8/2008
(Continued)

*Primary Examiner* — Sanchit K Sarker
(74) *Attorney, Agent, or Firm* — HUNTON ANDREWS KURTH LLP

(57) ABSTRACT

A system can include, for example, a secure data module(s) configured to store sensitive data regarding the user(s), a synthetic dataset generating module(s) configured to generate the synthetic dataset based on the sensitive data, and a control module configured to receive a request from an application for a dataset related to the user(s), provide the request to the synthetic dataset generating module(s), receive the synthetic dataset from the synthetic dataset generating module(s), and provide the synthetic dataset to the application. The synthetic dataset generating module(s) can be configured to generate the synthetic dataset based on the dataset.

20 Claims, 10 Drawing Sheets

(56) References Cited

U.S. PATENT DOCUMENTS

| | | | |
|---|---|---|---|
| 7,412,059 B1 | 8/2008 | Pauker et al. | |
| 7,564,977 B2 | 7/2009 | Marino et al. | |
| 7,580,521 B1 | 8/2009 | Spies et al. | |
| 7,594,116 B2 | 9/2009 | Bruns et al. | |
| 7,613,777 B2 * | 11/2009 | Giles | H04L 51/212 |
| | | | 709/206 |
| 7,783,044 B2 * | 8/2010 | Moreh | H04L 9/0841 |
| | | | 713/168 |
| 2003/0196080 A1 | 10/2003 | Karman | |
| 2004/0096064 A1 | 5/2004 | Merzenich | |
| 2009/0271627 A1 | 10/2009 | Cohen et al. | |
| 2011/0171936 A1 * | 7/2011 | Khoury | H04L 51/224 |
| | | | 455/412.2 |
| 2015/0213195 A1 * | 7/2015 | Blechman | G16H 10/60 |
| | | | 705/51 |
| 2018/0129657 A1 * | 5/2018 | Guest | G06F 9/485 |
| 2018/0205686 A1 * | 7/2018 | Jolly | H04L 63/0435 |

FOREIGN PATENT DOCUMENTS

| | | |
|---|---|---|
| CA | 2798531 C | 6/2014 |
| CA | 2693133 C | 10/2014 |
| EP | 1149483 A1 | 10/2001 |
| EP | 1415431 A2 | 5/2004 |
| EP | 1473868 A1 | 11/2004 |
| EP | 1604484 A2 | 12/2005 |
| EP | 1357697 B1 | 5/2006 |
| EP | 1665623 B1 | 12/2016 |
| GB | 2568966 A | 6/2019 |
| WO | 2002054665 A1 | 7/2002 |
| WO | 2005099352 A2 | 10/2005 |

* cited by examiner

SYSTEM, METHOD, AND COMPUTER-ACCESSIBLE MEDIUM FOR HIDING MESSAGES SENT TO THIRD PARTIES

CROSS REFERENCE TO RELATED APPLICATION

The subject application is a continuation of U.S. patent application Ser. No. 16/991,919 filed Aug. 12, 2020, the contents of which is hereby incorporated by reference in their entirety.

FIELD OF THE DISCLOSURE

The present disclosure relates generally to secure messaging, and more specifically, to exemplary embodiments of an exemplary system, method, and computer-accessible medium for hiding messages sent to third parties.

BACKGROUND INFORMATION

The first cellular devices (e.g., mobile devices) were limited to making phone calls. As mobile platforms developed, short messaging service ("SMS") text messages became available. SMS is a text messaging service component of most telephone, Internet, and mobile device systems. It uses standardized communication protocols to enable mobile devices to exchange short text messages. SMS text messages could be transmitted by almost any mobile device having a cellular connection, and were platform and service agnostic (e.g., they were not limited to a device from a particular manufacturer or a service from a particular supplier).

As cellular systems developed further, cellular networks evolved to provide network connections to mobile devices. Various network-based messaging services emerged including Apple Messages and WhatsApp. These services, or applications, allowed users to send messages to devices having access to the service, or application, and facilitated complex communications between users. They also facilitated various encryption schemes between users of the application.

The next evolution of messaging services included time-based, or expiration-based, messaging services. When one user sends a message to another user, the first user can set a length of time that the message is available to be read. After the time elapses, the message expires and "explodes." The message is then no longer available to the second user. However, this type of messaging service suffers from many drawbacks. First, the expiration time has to be determined by the sender prior to sending the message, and cannot be changed. Once the message expires, the receiver loses access to the message, and the only way for the user to access the message again is for the sender to resend the message. Thus, the sender has limited control over the receiver's ability to access the message, and the receiver has limited ability to view a message.

Thus, it may be beneficial to provide an exemplary system, method, and computer-accessible medium for hiding messages sent to third parties, which can overcome at least some of the deficiencies described herein above.

SUMMARY OF EXEMPLARY EMBODIMENTS

An exemplary system, method, and computer-accessible medium for granting or denying access to a message(s) within a messaging application, can include, receiving the message(s) from a sender, storing the message(s) in the messaging application, receiving a request(s) to read the message(s) from a user associated with the messaging application, sending the request(s) to the sender, receiving a reply from the sender that includes an approval or a denial of the request(s), and granting or denying access to the message(s) based on the reply. The message can be an encrypted message(s) that has been encrypted using a public key(s) or a secret key(s). The reply can include a decryption key, and the message(s) can be decrypted based on the decryption key.

In some exemplary embodiments of the present disclosure, the message(s) can include a group of messages, and the group of messages can be associated with a single decryption key that can be used to decrypt all of the messages in the group. The message(s) can include a plurality of messages each having its own decryption key, and the request(s) can include a plurality of requests. The requests can be sent to the sender, the reply can be received, where the reply can include a separate approval or denial for each of the requests, and access to each of the messages can be separately granted or denied based on the reply. The message(s) can be automatically deleted if the request(s) is denied. A deletion time period can be received from the sender, and the message(s) can be automatically deleted after the deletion time period has expired.

In certain exemplary embodiments of the present disclosure, a screenshot request can be detected for a screenshot that includes the message(s), and the screenshot request can be blocked. A hash associated with the messaging application can be determined, which can be compared to a further hash associated with an official version of the messaging application, and the request can be automatically denied if the hash does not match the further hash.

Additionally, an exemplary system, method, and computer-accessible medium for granting or denying access to a message(s) can include, sending the message(s) to a receiver to be stored in a messaging application, receiving a request(s) to read the message(s) from the messaging application, determining a reply which can include a grant or a denial of the request(s), and sending, to the receiver, the grant or the denial including information to facilitate access to message(s). The message(s) can be encrypted prior to sending the message(s), and the information can include a decryption key used to decrypt the message(s). The message(s) can include a group of messages, and all of the messages in the group can be encrypted using a single decryption key.

In some exemplary embodiments of the present disclosure, the message(s) can include a plurality of messages, and each of the messages can be separate encrypted using different encryption keys. A hash associated with the messaging application can be received, can be compared to a further hash associated with an official version of the messaging application, and the reply can be determined based on the comparison. A permanent access request from the messaging application can be received for permanent access to the message(s), and the permanent access request can be granted or denied. A first encryption key and a first decryption key can be generated based on the receiver and all messages sent to the receiver can be encrypted using the first encryption key, and a second encryption key and a second decryption key can be generated based on a further receiver and all messages sent to the further receiver can be encrypted using the second encryption key, where the first encryption key can be different than the second encryption key and the first decryption key can be different than the second decryption key.

In certain exemplary embodiments of the present disclosure, a version associated with the messaging application can be determined, and the message(s) can be encrypted based on the version. An expiration time can be received from a user associated with a device storing the computer-accessible medium, and the request(s) can be automatically denied if the expiration time has expired.

Further, an exemplary system, method, and computer-accessible can include receiving the encrypted message(s) from a sender, storing the encrypted message(s) in the messaging application, receiving a request(s) to read the encrypted message(s) from a user associated with the messaging application, sending the request(s) to the sender, receiving a reply from the sender that includes an approval of the request(s) and a decryption key or a denial of the request(s), and decrypting the encrypted message(s) using the decryption key if the reply is the approval or automatically deleting the encrypted message(s) if the reply is the denial.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

Exemplary Secure Messaging

Figure 1:
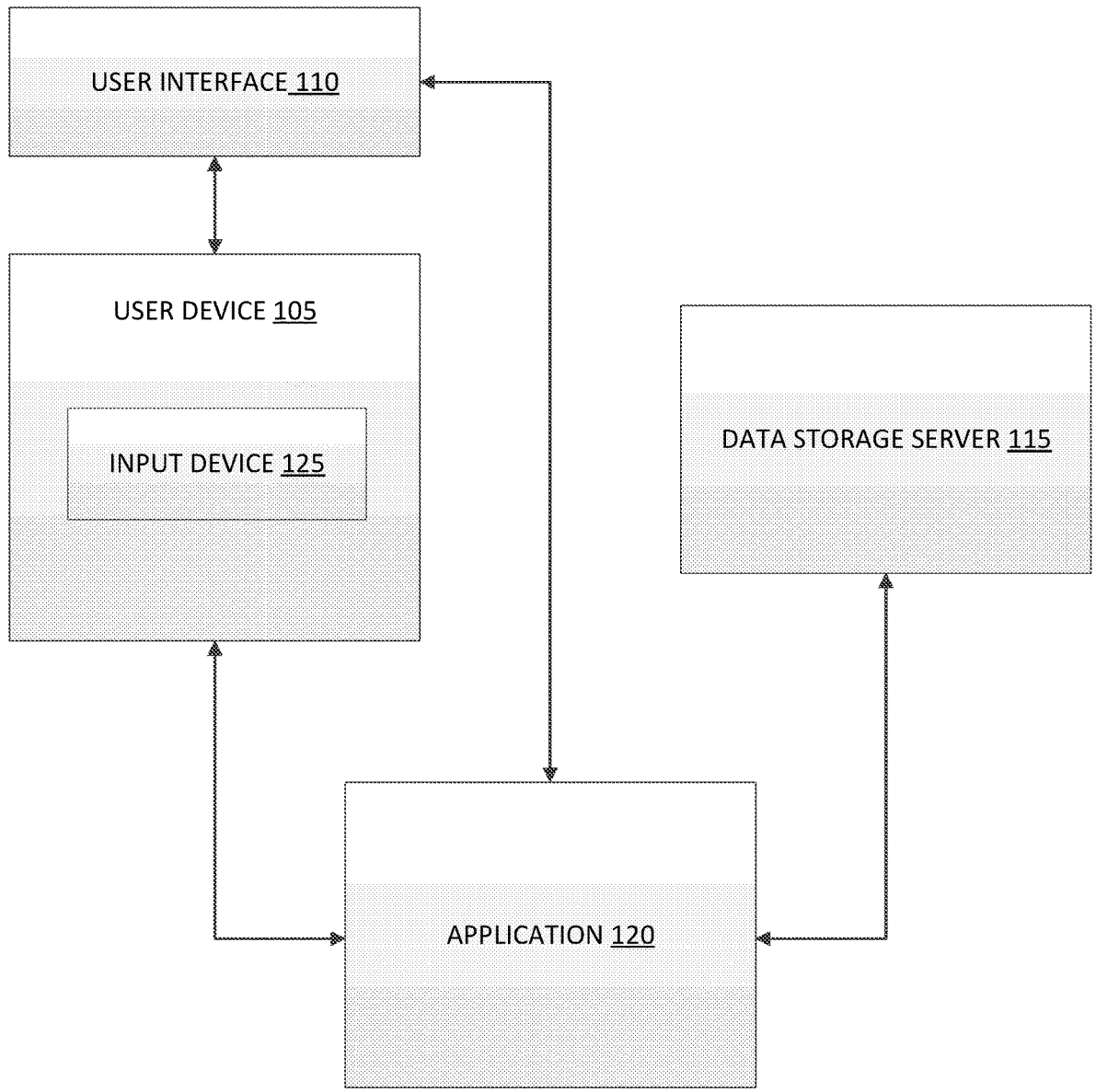
FIG. 1 is an exemplary diagram illustrating a device for secure messaging according to an exemplary embodiment of the present disclosure.

The exemplary system, method, and computer-accessible medium can facilitate secure communication between multiple devices while allowing the sender of a message to retain granular control over access to the message by the receiver, even though the message is stored on another device. As discussed herein, the sender will refer to the user of the sending device and the receiver will refer to the user of the receiving device.

For example, the sender can send a message to a receiver, which can be received and stored on the receiving device of the receiver. However, the receiver may still not be able to read the message. When the receiver wants to read the message, the receiver can request access from the application stored on the receiving device. The receiving device can then send a request to the sending device requesting access by the receiver to read the message. The message can be a single message, or a group of messages covering a particular time period, as will be discussed below. The sending device, after receiving the request, can determine whether or not to facilitate the receiver to read the message. For example, the sending device can prompt the sender to grant or deny access to the message. If the request is granted, the sending device can send an authorization to the receiving device facilitating the receiving device to make the message available to the receiver. If the request is denied, then the sending device can send the denial to the receiving device. The receiving device can then inform the receiver of the denial. The reply to the request can include a simple yes or no, and the receiving device can take action based on the request (e.g., by showing the message to the user or not showing the message to the user). The reply can also include a decryption key, as discussed below, facilitating the receiving device to decrypt the message.

If the request is denied, the receiving device can automatically delete the message from the memory of the receiving device. Thus, the receiver will never be able to access the message, and a placeholder for the message, as discussed below, can be removed from the receiving device (e.g., from the messaging application). However, the denial can also include permission to maintain the message in storage, even though the receiver cannot view the message. The receiver can then request access at a later time. Whether or not the message should be deleted or maintained in storage can be determined by the sending device (e.g., by the sender), and can be transmitted along with the denial of the request.

In addition to performing an action based on a request from the receiver, the sender can also take preemptive action. For example, if the sender knows they already want to grant access to the receiver (e.g., for a particular period of time), the sending device can send the decryption key along with the message. When the receiver attempts to read the message, the receiving device will automatically decrypt the message. However, after the particular period of time has expired, the message will be automatically encrypted by the receiving.

The exemplary system, method, and computer-accessible medium can facilitate secure communication between multiple devices using an application that can be stored on any communication device or apparatus. FIG. 1 illustrates a system according to an exemplary embodiment that can be used to facilitate secure communication as described herein. In particular, system 100 can include user device 105 displaying user interface 110, data storage server 115, and application 120 that can be communicatively connected to user interface 110 and data storage server 115. Input device 125 can be operably connected to user device 105 and can be used by a user to write a secure message, and control access to the secure message by a receiver.

User device 105 can be, but is not limited to, a smartphone, laptop, desktop computer, tablet computer, personal digital assistants, thin client, fat client, Internet browser, customized software application or kiosk, etc. It is further understood that user device 105 can be of any type of device that supports the communication and display of data and user input. The present disclosure is not limited to a specific number of user devices, and it is understood that the system 100 can include a single user device or multiple user devices. For example, multiple device can communicate with multiple devices.

User device 105 can include a memory. The memory can be a read-only memory, write-once read-multiple memory or read/write memory, for example, RAM, ROM and EEPROM. User device 105 can include one or more of these memories. A read-only memory can be factory programmable as read-only or one-time programmable. One-time programmability can provide the opportunity to write once then read many times. A write once/read-multiple memory can be programmed at a point in time after the memory chip has left the factory. Once the memory is programmed, it may not be rewritten, but it can be read many times. A read/write memory can be programmed and re-programed many times after leaving the factory. It can also be read many times.

User device 105 can further include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. The messages between devices can be transmitted using the data communication of the device. Additionally, the message read request, and any grant or denial, can also be transmitted using the data communication of the device. This network can include, without limitation, telephone lines, fiber optics, IEEE Ethernet 902.3, a wide area network, a local area network, a wireless personal area network, a wide body area network, or a global network such as the Internet. User device 105 can also, but need not, support a short-range wireless communication interface, such as near field communication, radio-frequency identification, and Bluetooth.

User device 105 can include at least one display and input device. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user device that is available and supported by user device 105, such as, for example, a touch-screen, keyboard, mouse, cursor-control device, touch-screen, microphone, digital camera, video recorder, or camcorder. These devices can be used to enter information (e.g., type the message and grant or deny access to the message) and interact with the system 100 as described herein.

User interface 110 can be displayed on user device 105. User interface 110 can be a program of software (e.g., an application, mobile or non-mobile) which can be run on user device 105 or a remote server. User interface 110 can be run on a remote server, which can be in data communication with user device 105. User interface 110 can be configured to receive input from a user via an input device operably connected to user device 105 (e.g., typing of a message and controlling access to the message). User interface 110, on the sending device, can receive an input from the sender (e.g., a message to be sent), for example, using an input device, which can then be sent to the receiving device. User interface 110 on the receiving device can prompt the user regarding the receipt of the message. As discussed below, the message can be blurred, and the receiver cannot read the message. The receiving, using user interface 110 on the receiving device, can request access to read the message, for example, using an input device on the receiving device. User interface 110 can be communicatively connected to application 120 (e.g., the messaging application, which can be used for secure communication between the sending device and the receiving device). Application 120 can be a single application designed and developed by a single company, and can be proprietary (e.g., it cannot interface with an application by another company). Alternatively, the underlying technology used for secure communication, which is described herein, can be application agnostic, and can be implemented on different applications developed by different companies.

Application 120 can be any software, program, email client, or web browser that supports the communication and display of data, information, and input received from a user and/or from a server or other application. Application 120 can include any plug-in, add-on, and/or extension associated with a software, program, email client, and/or web browser.

User interface 110 and/or application 120, can be, or can be run on, dedicated server computers, such as bladed servers, or can be personal computers, laptop computers, notebook computers, palm top computers, network computers, mobile devices, or any processor-controlled device capable of supporting the system 100.

Data storage server 115 can store the secure messages that can be sent between devices (e.g., between a receiving device and a sending device). Data storage server 115 can implement software logic-based isolation in order to prevent access to the message by the application 120 located on the receiving device. Software logic-based isolation can include utilizing an isolator, which can make decisions as to whether the application can access the secure message. Alternatively, hardware-based isolation schemes can be implemented.

For example, to remove the strain on a piece of software performing the isolation, hardware can be included that can isolate software inside a system. A particular software can manage the isolation enforcement via the hardware. Larger pre-TrustZone technology systems can utilize a piece of hardware to enforce the isolation policies of the system, for example, a Memory Management Unit ("MMU"). The MMU can split memory up into isolation regions based on tables, which can be held in isolated memory. If system 100 is implemented on a simple device (e.g., based on the number of processing cores) then the operating system ("OS") can easily manage the functionality of the trusted zone. However, for more complex systems, additional trusted zone schemes can be used. For example, TrustZone+ TEE techniques can put the access control at the peripheral or memory and separate its management from system design and software not focused on security. This isolation barrier can separate assets, giving two execution environments, which can prevail throughout the general assets of the system on chip ("SoC"): (i) a "Secure World" for running Trusted Code, the Secure world can host the Trusted Execution Environment ("TEE") and (ii) a "Normal" World for running general code. The Normal World can host the Rich OS Execution Environment ("REE"). The REE and the Rich OS do not have to be "Rich" in functionality; they just have to be outside the isolation boundary. With the introduction of Hypervisors inside this class of device, the Normal World can potentially host many of these Rich OSs. Generally, a TEE does not distinguish between different REE or Rich OS in a device except for message routing. From the TEE's point of view, Rich OS are all untrusted by the TEE, and so any distinction can be based on untrusted data.

While FIG. 1 illustrates a single instance of user interface 110, data storage server 115, and application 120, it is understood that other embodiments may use multiple computer systems or multiple servers as necessary or desired to support a user and may also use back-up or redundant servers to prevent network downtime in the event of a failure of a particular server. It is further understood that in some embodiments, a plurality of additional data servers may store information and/or data utilized by the system 100.

A receiver can attempt to circumvent the deletion of a message by taking a screenshot of the device showing the message on the display. The exemplary system, method, and computer-accessible medium, however, can prevent the screenshot. For example, a screenshot request can be detected, which can be automatically denied as long as one or more messages are shown on the screen. Additionally, if a screenshot is detected, a screenshot request can be sent from the receiving device to the sending device. The sending device can then prompt the sender to approve or deny the taking of the screenshot. The approval or denial can then be sent back to the receiving device. If the screenshot request is approved, then the screenshot can be facilitated and stored on the receiving device. If the screenshot request is denied, then the screenshot will be prevented.

Figure 2:
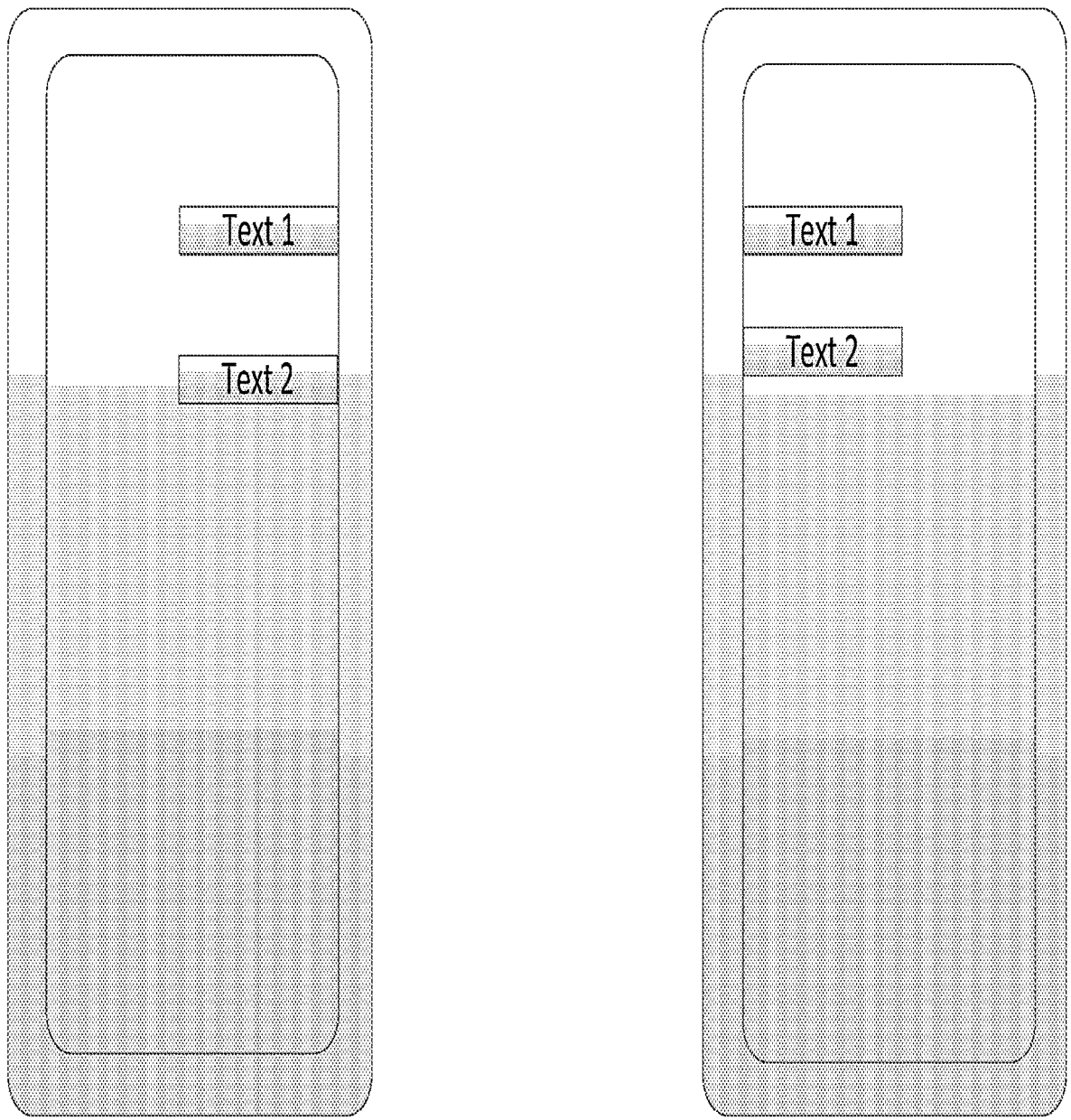
FIG. 2 is an exemplary diagram of two devices communicating using a messaging platform according to an exemplary embodiment of the present disclosure.

FIG. 2 is an exemplary diagram of two devices communicating using a messaging platform according to an exemplary embodiment of the present disclosure. For example, as shown in FIG. 2, a device 205 (e.g., a sending device) can communicate with a device 220 (e.g., a receiving device). Devices 205 and 220 can be any device as described herein (e.g., a mobile device, tablet, computer, etc.). Additionally, device 205 can be one type of device (e.g., a mobile phone) while device 220 can be a different type of device (e.g., a tablet). Device 205 can include a display 210, which can be used to display information to a user of device 205. Device 220 can include its own display 225, which can be used to display information to the user of device 225. Display 210 and 225 can also function as input devices (e.g., having touchscreens embedded on or under the display device).

When a chat is initiated between device 205 and device 220, an encryption mechanism, for example, pretty good privacy ("PGP") can be setup between the two devices. The user of device 205 can then input one or more messages 215 using display 210. Messages 215 can be transmitted to device 220, and can be shown on display 225 as messages 230. However, prior to sending messages 215, device 205 can encrypt messages 215 using any suitable encryption method/scheme, as described herein. Encrypted messages 215 can then be transmitted to device 220 and can be indicated by messages 230. However, encrypted messages 230 are not available to be viewed by the user of device 220, and the user does not have the requisite decryption information (e.g., a decryption key), which can be used to decrypt messages 230.

When encrypted messages 230 are received by device 220, a notification can be provided to the user of device 220 that one or more encrypted messages 230 have been received. Each encrypted message can be shown as a placeholder where the message would normally be viewable in the messaging application. Thus, the receiver has an indication that there is a message that has been encrypted and cannot be viewed. Exemplary placeholders can include, but are not limited to, textbox outlines, blurred images, an encryption sign or symbol, covered by random characters, redacted with a blackbox, etc. The method of obfuscating the encrypted messages can be selected by the receiver when the receiver sets up the messaging applications (e.g., in the settings associated with the application). In order to view the encrypted messages, the receiver can initiate a request within the messaging application on device 220. The request can be for a single message, a group of messages (e.g., based on a period of time or by conversation) or for all messages received by the receiver. The one or more requests can be sent to device 205, and a notification can be provided to the sender that the receiver has requested access to one or more encrypted messages 230. The sender can then grant or deny some or all of the requests.

If the sender grants access to some or all of encrypted messages 230, device 205 can send one or more decryption keys to device 220, which can be used to decrypt some or all of encrypted messages 230. The sender can maintain a database of all encryption/decryption key pairs used, as well as which chats, messages, etc. each encryption/decryption pair is associated with. The granting of access by the sender can include a period of time that encrypted messages can be viewed (e.g., 10 seconds, 30 seconds, 1 minute, 5 minutes, 30 minutes, 1 hour, 1 day, or any duration set by the sender). After the period of time has expired, device 220 can automatically reencrypt messages 230. If the sender denies the request, the sender can choose whether or not to delete messages 230 from device 220. For example, if the sender chooses not to delete messages 230, then messages 230 will still be stored by device 220. However, they will be in an encrypted form, and can only be viewed by the receiver by requesting access from the sender again.

If the sender chooses to delete the messages, or only some of the messages, the deletion request can be sent to device 220, and device 220 can automatically delete messages 230. A notification can be send to the receiver that some or all of the requests have been denied, and that some of the messages have been deleted, including an indication on display 225 of which messages were deleted. After some or all of the messages are deleted, an additional placeholder can be displayed on display 225, indicating that messages were previously received, including the day, date, and time, but that the messages were deleted and are no longer available. If the receiver wants to receive the messages again, device 220 can send a request to device 205 to receive some or all of the deleted messages. The sender can be prompted to approve or deny the request. If the request is denied, then the messages will not be resent to device 220. If the request is approved by the sender, or a portion of the request is approved by the sender, then device 205 can retransmit messages 215, after again encrypting them using the same or a different encryption/decryption pair. These messages can be displayed on display 225 in the same position from which they were deleted.

As an alternative to displaying placeholders in place of deleted messages, the message can be completely deleted, and no placeholder can be present indicating that there previously was a message that has not been deleted. The use of a placeholder for deleted messages can be setup by the receiver or by the sender. If there is a conflict in the settings between the sender and the receiver (e.g., the receiver wants to maintain a placeholder for deleted messages but the sender does not), the sender can control as the information belongs to the sender.

If the sender chooses to deny a request and delete some or all of the messages on device 220, display 210 on device 205 can be updated to indicate that the messages were deleted. Various indications can be used based on the status of the deletion. For example, a first indication 235 can be used to indicate to the sender that a deletion request has been made to device 220. After device 220 performs the deletion, device 220 can send a deletion confirmation to device 205, confirming that the message has been deleted. Indication 235 can then be updated to indication 240, which can indicate to the sender that the message has actually been deleted. The indications can be automatically updated as messages are deleted (e.g., individually or in batches).

In addition to deleting one or more messages after receiving a request from a receiver, a sender can review all messages and send a deletion request for any message. For example, the sender can review various chats, and various messages in chats, and select messages to be deleted. This can be performed individually or in batches. Once the sender initiates the deletion request, the deletion request can then be transmitted from device 205 to device 220. Indication 235 can then be added, which can indicate that the deletion request has been initiated. Once device 220 performs the deletion, the deletion confirmation can be transmitted to device 205, and the indication can be updated to indication 240, which can indicate that the deletion has been performed.

The sender can setup various rules for automatically approving or denying requests to access messages. For example, for certain chats, the sender can setup an automatic approval. Thus, when a request is received to decrypt any messages in the chat, the approval can be automatically sent without having to notify the sender. The approval can be for certain chats, and for certain periods of time for certain chats (e.g., the sender can setup an automatic approval for request received during a particular period of time). After the period of time has expired, the requests will no longer be automatically approved. The sender can also revoke the automatic approval at any time.

As shown in FIG. 2, a single sender, using device 205, can communicate with a single receiver, using device 220. However, multiple devices can participate in a group chat, where each device can function as both a sender and a receiver. When a sender sends a message, it can be received and obfuscated by each of the receivers. Each receiver can then request access to one or more messages associated with a particular sender. The sender can receive the request from each receiver, and can grant or deny each request from each receiver. The sender can also elect to grant access to all devices at once. The sender can also grant or deny access to certain messages separately for each receiver (e.g., receiver 1 can access some messages and receiver 2 can access other messages, which can overlap). The sender can also set the expiration time period when each message is reencrypted. This time period can be set globally for all receivers, or each receiver can have its own time period. Additionally, the sender can send a deletion request to some or all of the receivers. Any and all functions and attributed described herein can be applied when a group chat is performed.

Figure 3:
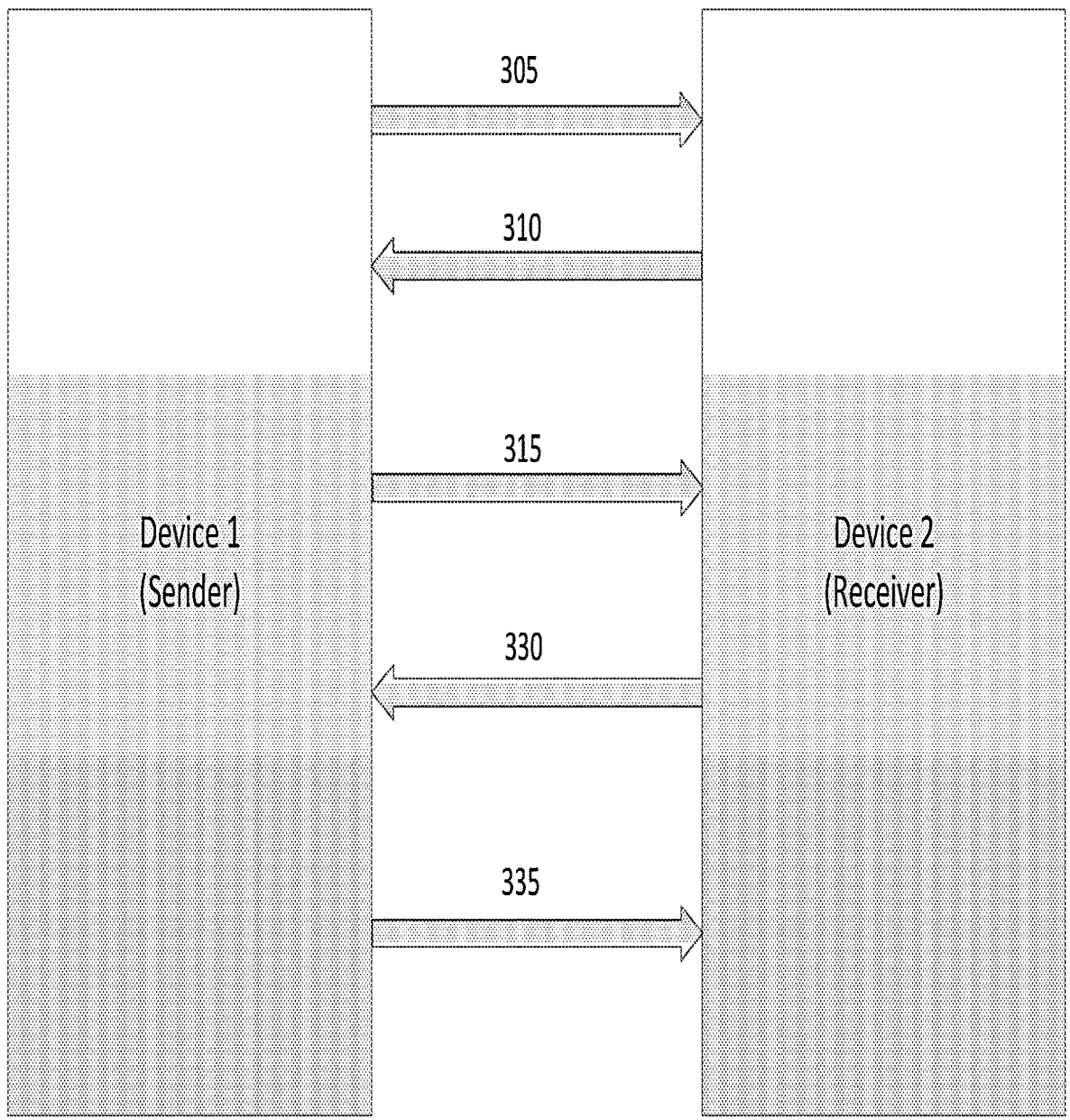
FIG. 3 is an exemplary diagram illustrating the transmission and receipt of messages between two devices according to an exemplary embodiment of the present disclosure.

FIG. 3 is an exemplary diagram illustrating the transmission and receipt of messages between two devices according to an exemplary embodiment of the present disclosure. For example, at procedure 305, device 2 (e.g., the sender) can send one or more messages to Device 2 (e.g., the receiver). The message can be encrypted as described herein. When the receiver wants to read the message, at procedure 310, Device 2 can send a request to Device 1 for access to the message. At procedure 315, Device 1 can send an approval to the request, including a decryption key, or a denial of the request. At procedure 320, an additional read request can be sent from Device 2 to Device 1. The additional read request can be to read the same message for which access was previously requested, which could have been approved or denied, or for a different message. At procedure 325, a further approval or denial of the request can be sent from Device 1 to Device 2, including a decryption key if the request is approved.

As described herein, the devices are shown as a sender and a receiver, and the description herein relates to the sender sending messages to the receiver. However, the receiver can also be a sender. For example, the receiver can send messages to the sender, and the procedures and attributes described herein can also be applied when the receiver acts as a sender, and the sender acts as a receiver. Additionally, a sender can communicate with multiple receivers, and can itself also be a receiver for one or more senders. Further, the receiver can communicate with multiple senders, and can itself also be a sender for one or more receivers.

In addition to requesting temporary access to a message (e.g., as described above), a receiver can request permanent access to one or more messages. Permanent access allows the receiver to view the message without requesting the decryption key from the sender. For example, the receiver can select one or more messages for permanent access. The permanent access request can be sent to the sender. The sender can determine whether or not to grant permanent access to some or all of the messages for which the receiver has requested permanent access. If the request is granted, in whole or in part, the sender can send the receiver the associated decryption key, and the receiver can permanently decrypt the messages using the decryption key provided by the sender. However, the other layers of encryption as described herein can be maintained. However, in order to view the message, the receiver does not need to request access from the sender.

The exemplary system, method, and computer-accessible medium can implement a hash in order to confirm the security of the messaging applications. For example, when an application is downloaded, (e.g., a particular version of the application), it can have a hash associated with that specific version, which can indicated that code is unmodified. The exemplary system, method, and computer-accessible medium can check the version of that code against the version of the code that can be publically available (e.g., on GitHub or the app store) in order to ensure that it is not a corrupted version of that code. When encryption/decryption is established between two devices (e.g., by initiating a chat) the application versions can be communicated with each other. Additionally, a binary can be built (e.g., a build). This binary can still have the hash associated with it, and can be the individual zeros and ones that create the code. This can be referred to as a build hash. If the code of the application is modified, however, then the hash will not match, indicating a corrupted version of the code (e.g., it could be a modified application intended to circumvent control of the decryption key from the sender).

The OS can control the binary and can install the application on the device. Thus, the version of the application being run can be verified (e.g., through the provider of the application, for example the Apple iTunes store or the Google Play store). When a user sends a message to another user (e.g., a sender sends a message to a receiver), the user's response can include the hash. If the hash matches, then the message can be sent (e.g., the encrypted message).

In addition to using the hash, another secret key can be stored inside of the binary. Then only that binary of that specific version would be able to decrypt a message. In order to maintain backwards compatibility with different versions of the application, binaries from previous versions can be stored in updated versions. However, older versions of the application may not be able to have the same functionality when communicating with newer versions of the application (e.g., the old application may be able to decrypt messages from newer versions of the application, but may not be able to verify newer versions of the application in order to send encrypted messages).

Exemplary Third Party Control

As discussed above, the sender of the message generates the content (e.g., the message), encrypts the content, and then sends the encrypted content to the receiver. The receiver then requests permission from the sender to read the content, which can be approved or denied by the sender. However, in certain circumstances, the sender might not be the owner of the content, and the sender may need third-party permission (e.g., from the company employed by the sender and the receiver) in order to grant permission to the receiver to access the content.

For example, the sender can send content to the receiver. The receiver can request access to the content from the sender. The sender has the option to approve or deny the request. If the request is denied, then no third-party permission is needed. However, if the sender approves the request, additional permission can be needed from a third party in order to grant the request. In such a case, the approval by the sender can trigger the sending device to automatically request permission from the third party. If the third party denies the request, then the receiver cannot access the content. If the third party approves the request, then the receiver can be granted access to the content. The third party can send the decryption key directly to the receiver to decrypt the message, or the decryption key can be sent to the sender to be sent to the receiver. Instead of the sender sending the approval request to the third party, the receiver can send the request to the sender and separately send a request to the third party. Both the sender and the third party can approve or deny the request, and approval from both the sender and the third party would be needed in order for the receiver to access the content.

A single encryption/decryption key pair can be generated, and the decryption key can be stored only by the third party. Thus, even if the sender wanted to, it could not, on its own, provide access to the encrypted content. There can also be multiple encryption/decryption key pairs, one associated with the sender, and one associated with the third party. Thus, permission would be required from the sender and the third party, and the distinct decryption key from each party would be needed by the receiver in order to decrypt the content.

The third party can setup automatic or manual approval of request. If manual approval is setup, then a person associated with the third party would need to manually approve the granting of each request. This can be beneficial for particularly sensitive content (e.g., intellectual property, trade secrets, sensitive employee information, etc.). However, for normal messaging between two employees employed by the third party, manual approval is not feasible. In such a case, automatic approval can be setup that automatically grants requests between the sender and the receiver (e.g., between two employees employed by the company). If the receiver leaves the company, the third party can automatically revoke access. Thus, a request will be automatically denied for the particular receiver, and the particular receiver would not be able to access content owned by the third party.

Exemplary Secure Data Storage

In addition to facilitating secure communication between a receiving device and a sending device, the exemplary system, method, and computer-accessible medium can facilitate secure data storage of sensitive information. For example, many companies store sensitive information about their customers and/or their employees (together referred to as customers below). Sensitive information can include, but is not limited to, credit card account information, bank account information, social security numbers, addresses, phone number, etc. After this information is provided to the company, the customer has to rely on the company to keep this information secure. However, as is evident with the mass numbers of data breaches occurring, companies are not particularly good at securing and maintaining customer information. Either their systems are vulnerable to attack, or the information is not properly encrypted, or both. In either case, data breaches can cause a lot of harm to customers. However, the exemplary system, method, and computer-accessible medium can facilitate granular control of the customer information by the customer, even though the information is stored by the company.

For example, when sensitive information is provided by a customer to a company, the sensitive information can be encrypted by the customer using, for example, any suitable encryption scheme as described herein. Each piece of sensitive information can be separately encrypted using its own encryption key, or all of the sensitive information can be encrypted using a single encryption key. The encrypted sensitive information can be stored on data storage operated by the company. However, the company cannot access the encrypted sensitive information. Thus, even if a data breach were to occur, the hackers would not be able to decrypt the encrypted sensitive information.

When the company needs to access the encrypted sensitive information, a request can be sent to the customer requesting access. Access can be requested for a single piece of encrypted sensitive information (e.g., only a credit card number or only a social security number), or the company can request access to all encrypted sensitive information that it has stored. The request can include what the sensitive information is, what the sensitive information is needed for, and for how long access is needed. The customer can then review the pertinent details regarding the request, and grant or deny access to the request. For example, the customer can grant the request in its entirety (e.g., allow access to all of the requested sensitive information) or only grant access to some of the sensitive information (e.g., allow access to the customer's address but not allow access to the customer's social security number).

If the customer grants the request, then a device associated with the customer can provide the company with the decryption key for the sensitive information. As discussed above, if a single encryption key is used to encrypt all of the customer's sensitive information, then only a single decryption key can be provided. However, if multiple encryption keys are used to separately encrypt the sensitive information, or separately encrypt groups of sensitive information, then multiple decryption keys can be provided in accordance with the encryption scheme used (e.g., the number of encryption keys used to encrypt the sensitive information).

In the customer denies the request, then the company cannot access the encrypted sensitive information as it does not have the decryption key. The customer has the option to deny the request, but allow the company to maintain storage of the customer's encrypted sensitive information to be used at a later time. Alternatively, the customer can send a deletion request along with the denial. The deletion request can include a request to delete the encrypted sensitive information stored at the company. The deletion request can require a manual deletion by a person at the company. Alternatively, the company can automatically process the deletion request upon receipt. Indications, as described above, can be provided to the customer regarding the deletion request (e.g., the request has been sent or the request has been processed).

Using the exemplary procedure described above, the exemplary system, method, and computer-accessible medium can facilitate a customer to maintain complete control over his or her own sensitive information. For example, if a customer frequently shops at a particular merchant, the customer can feel secure in allowing the company to store the customer's credit card information, as the stored credit card information is encrypted by the customer, and can only be decrypted based on a request granted by the customer. Thus, even if the company was hacked, the hacker could not use the credit card information pertaining to the customer. When a customer places an order with the company, the company can send a request for access to the customer's credit card information. This request, which can function in a manner similar to two-factor authentication, can be granted or denied by the customer. If the order is legitimate, the customer can grant the request for access to their credit card information. The customer can then provide the company with the means to access the sensitive information (e.g., using a decryption key). The company can decrypt the credit card information, place the order, and then the credit card information can be automatically reencrypted, and the company can no longer access the credit card information unless the company requests access from the customer.

The request from the company for access to the customer's sensitive information can come in various forms. For example, the customer can have an application installed on a device (e.g., mobile device, computer, tablet, etc.) that can facilitate the grant or the denial of the request. When the company sends to the request to the customer, the application can notify the customer of the request (e.g., using a popup notification, or any other notification that can be produced by the device). The customer, using the notification, can see what specific information is requested. The customer can then grant or deny the request, which can include granting and denying part of the request. The device can also maintain a log of all requests from different companies, including when the request was made, what was the information was requested, and what the requested information was used for. The user can also initiate a deletion request, which can include deleting all or some of the sensitive information stored at the company.

Exemplary Notification

Figure 4:
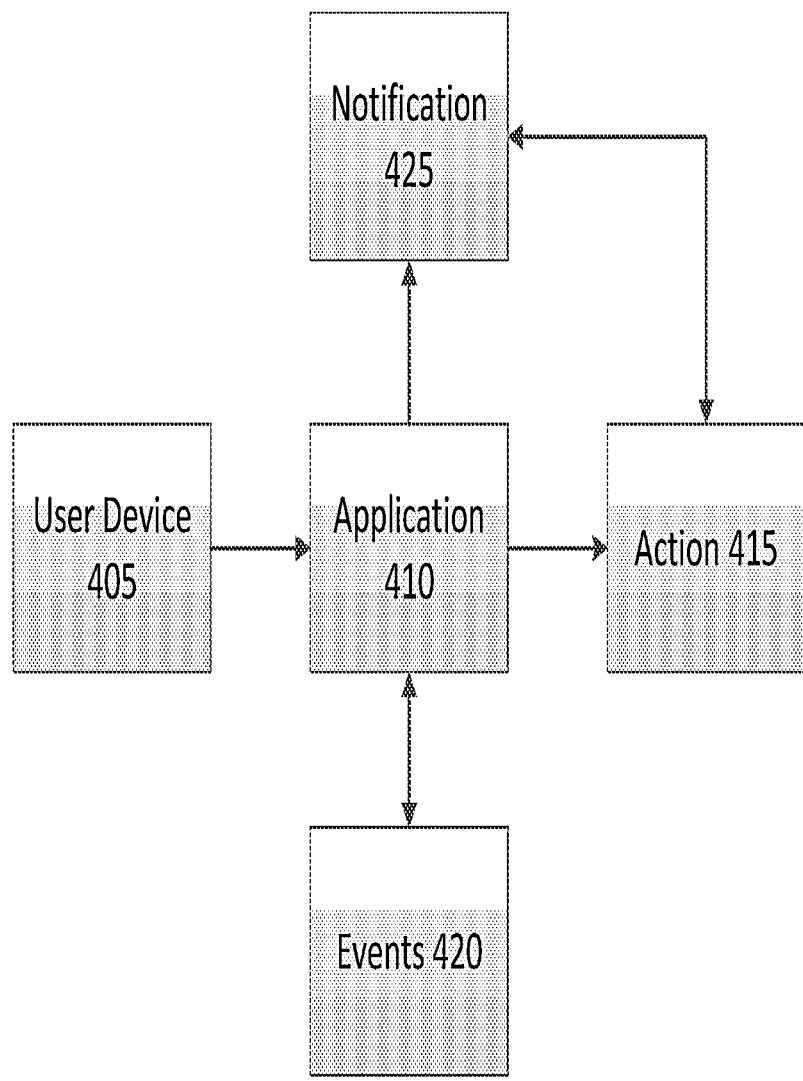
FIG. 4 is an exemplary diagram of a notification system according to an exemplary embodiment of the present disclosure.

FIG. 4 is an exemplary diagram of a notification system 400 according to an exemplary embodiment of the present disclosure. Notification system 400 can include user device 405 operating one or more applications 410 within, or in connection with, a web browser, or using one or more built-in notification systems 425 that can be available (e.g., notification systems provided by the operating system of the device). Application 410 can alert the user by presenting alerts in a browser and/or elsewhere on the user device 405, for example, using a popup notification, a badge, or by changing the icon status related to the application that facilitates a user to grant or deny a request. Notifications can be initiated based on the receipt of a request to access a message on a receiving device, or when a company needs to access sensitive information, as discussed herein above. The alerts can include the display of an icon or graphic, a change in the color, size, or shape of an already displayed icon or graphic, a push notification, a pop-up notification, a prompt, a pop-window, or other visual alerts, audible alerts (e.g., a verbal alert, playing a sound, playing a song or a portion of a song, playing a ring tone), a physical alert (e.g., a vibration or haptic alert), and a combination thereof.

Application 410 can be software additions that allow for the customization of computer programs, applications, and browsers as well as the customization of website content. Application 410 can be a software program implemented with hypertext markup language (HTML), JavaScript, cascading style sheets ("CSS") and other web-based technologies. Application 410 can also be a notification system built into the operating system that user device 405 runs. For example, the IOS and Android operating systems include built-in notification systems that can be used by applications installed on the operating system. Application 410 can perform data-based customization functions, which can include providing alerts, such as push notifications.

In system 400, the user can take action 415 such as reviewing the request to access the message or the sensitive information. The user can approve a request in its entirety, deny a request in its entirety, or some combination thereof. In system 400, application 410 can check for changes or events 420 relating to a request for access to the message or the sensitive information. For example, when a request is received by user device 405, application 410 can check for events 420, review the request, and prompt the user to perform an action 415 based on the event. The user can perform the action (e.g., the grant or the denial) directly within the notification 425 (e.g., if the notification is a push notification, the user can use 3D touch, or a time duration for the touch to access action 415). Alternatively, the notification can open the application, allowing for more granular control of the request directly in the messaging application, or the application that can be used to approve or deny the request for the sensitive information, as discussed herein.

Exemplary Encryption

The exemplary system, method, and computer-accessible medium, according to an exemplary embodiment of the present disclosure, can use any suitable encryption scheme to encrypt the messages and/or the sensitive information. The encryption algorithm can be used to convert the plaintext data into cipher text that can conceal the original content. The plaintext data can be restored from the cipher text through the decryption key. The encryption can be symmetric (e.g., secret-key encryption) or asymmetric (e.g., public-key encryption). Symmetric-key encryption algorithms can use the same or different keys for encryption and decryption. This type of encryption is fast and suitable for bulk data processing. Since everybody who has access to the key is able to decrypt the encrypted content, this method requires careful key management. Public-key encryption algorithms operate with two separate keys: the public key and the private key. The public key can be distributed freely while the private key should not be shared with anyone. If public key encryption is used, then the receiving device or the company can maintain a copy of the public key that can be used for encryption. For example, the sending device (e.g., or the customer) can use a single secret decryption key, which can be associated with a single public encryption key. The sending device, or the customer, can initially encrypt the message or the sensitive information using the public encryption key. When the sending device or customer grants access to the message, or sensitive information, as applicable, the receiving device or the company can automatically reencrypt the message or sensitive information, using the public key associated with the receiving device or customer, as applicable. Using a single public encryption key that is associated with a single decryption key can be easier to keep track of. However, this can be less secure, as the accidental divulgence of the single decryption key would allow access to all information (e.g., messages and sensitive information) encrypted using the public key. Thus, as an alternative to single public key encryption, multiple encryption/decryption key pairs can be used.

The encryption/decryption schemes described herein, which facilitate a sender/customer to control access to their messages and information, can be different from end-to-end encryption, which can also be used. Thus, two levels of encryption/decryption can be used. The exemplary system, method, and computer-accessible medium can utilize end-to-end encryption when setting up a chat between the sending device and the receiving device, or when transmitting the encrypted sensitive information from the customer to the company. End-to-end encryption can be used to scramble the messages and the encrypted sensitive information, and only the sender and the receiver of the messages have the "keys" to perform the initial decryption. However, the initial decryption, based on end-to-end encryption will not allow the receiving device or the company to actually access the message or the sensitive information. After the initial decryption, the receiving device or the company will have to request access from the sender or the customer as described herein The encryption/decryption pair can be generated using various suitable methods. For example, attributes related to the device used to encrypt the messages and/or sensitive information can be used to generate the keys. For example, based on the use of a device by each person, the device will have unique attributes associated with it. These attributes can be based on storage size, amount of storage used, contact information, numbers of applications installed, number of messages sent, accounts activated on the device, etc. All of this information can be used to generate one or more unique keys for the device to use to encrypt/decrypt messages and sensitive information.

Any number of unique encryption/decryption pairs can be generated. For example, a single encryption/decryption pair can be generated for all chats, or once pair for each chat associated with a receiving device. Alternatively, multiple encryption/decryption pairs can be generated for a single chat, and can be used to separately encrypt each message, or a group of messages. For example, all messages within a specific time period can use the same encryption/decryption pair (e.g., all messages within an hour, a day, a month, etc.). The user can also set the time period to use the same encryption/decryption pair, and a new encryption/decryption pair can be automatically generated after the time period. Thus, items in one time period can use a different encryption/decryption pair than items in a different time period. The user can also manually initiate a new encryption/decryption pair at any time.

The encryption key can be sent to the receiving device, or the company, as applicable, when it is generated. This can facilitate the receiving device or the company to automatically reencrypt a message or sensitive information after the receiving device has read the message or the company has accessed the sensitive information. However, the decryption key resides only on the sending device, or with the customer, and is only provided after the sender or the customer has granted access to the message or the sensitive information. Additionally, the receiving device or company can automatically delete the decryption key from its memory after the information (e.g., message or sensitive information) has been decrypted. By maintaining control of the decryption key at the sending device, or by the customer, granular control of messages and sensitive information is maintained by the sending device or customer.

Additional encryption can be included, which can be based on a passcode, a fingerprint, or a facial identification ("ID"). For example, if a request to read a message is granted, and the message is decrypted, the message can still be encrypted based on a passcode, a fingerprint, or a facial ID associated with the receiver. Thus, when attempting to read the message, the viewer will be prompted to unlock the message using the passcode, fingerprint, or facial ID. If a passcode is used, the passcode can be the same as the passcode to access the device itself, or a different passcode can be used. The use of a passcode, fingerprint, or facial ID, can add an additional layer of security. Thus, even if a person has gained access to the receiver's device, they still will not be able to view the message.

Figure 5A:
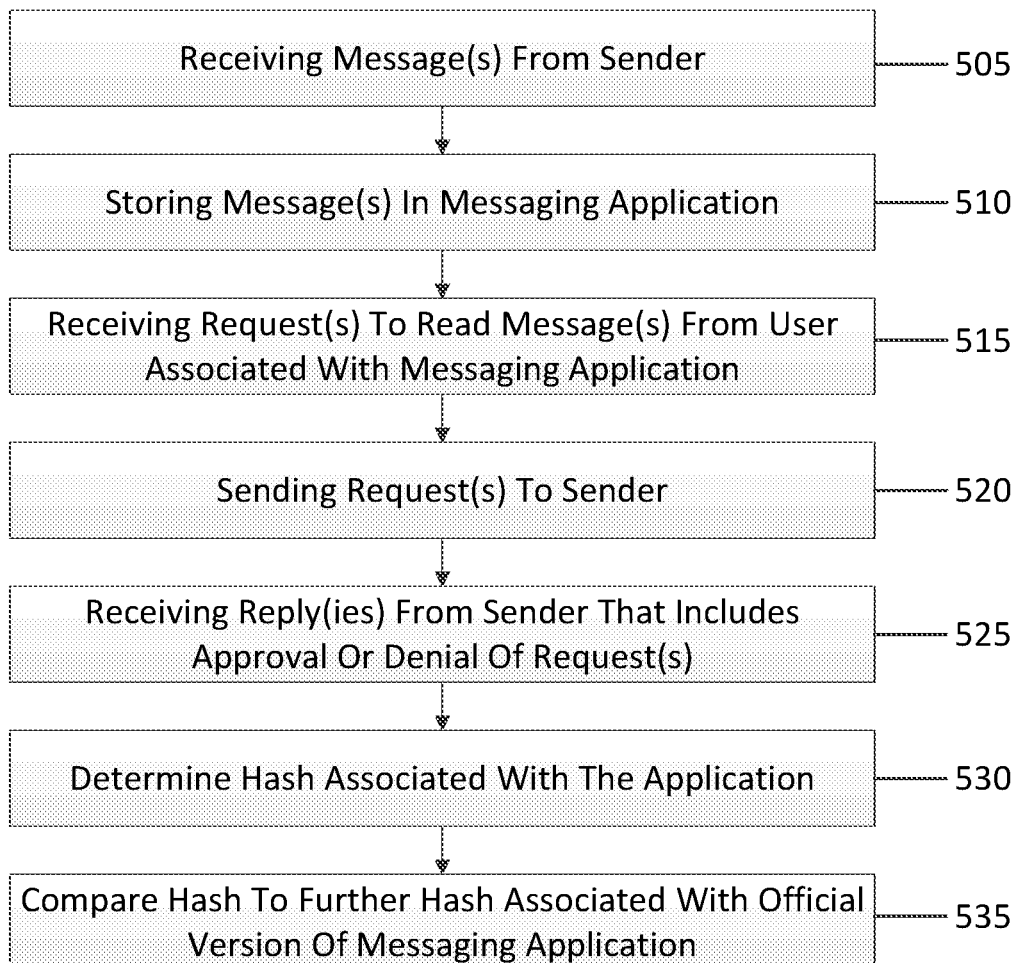
FIGS. 5A and 5B are flow diagrams of a method for granting or denying access to a message within a messaging application according to an exemplary embodiment of the present disclosure.
Figure 5B:
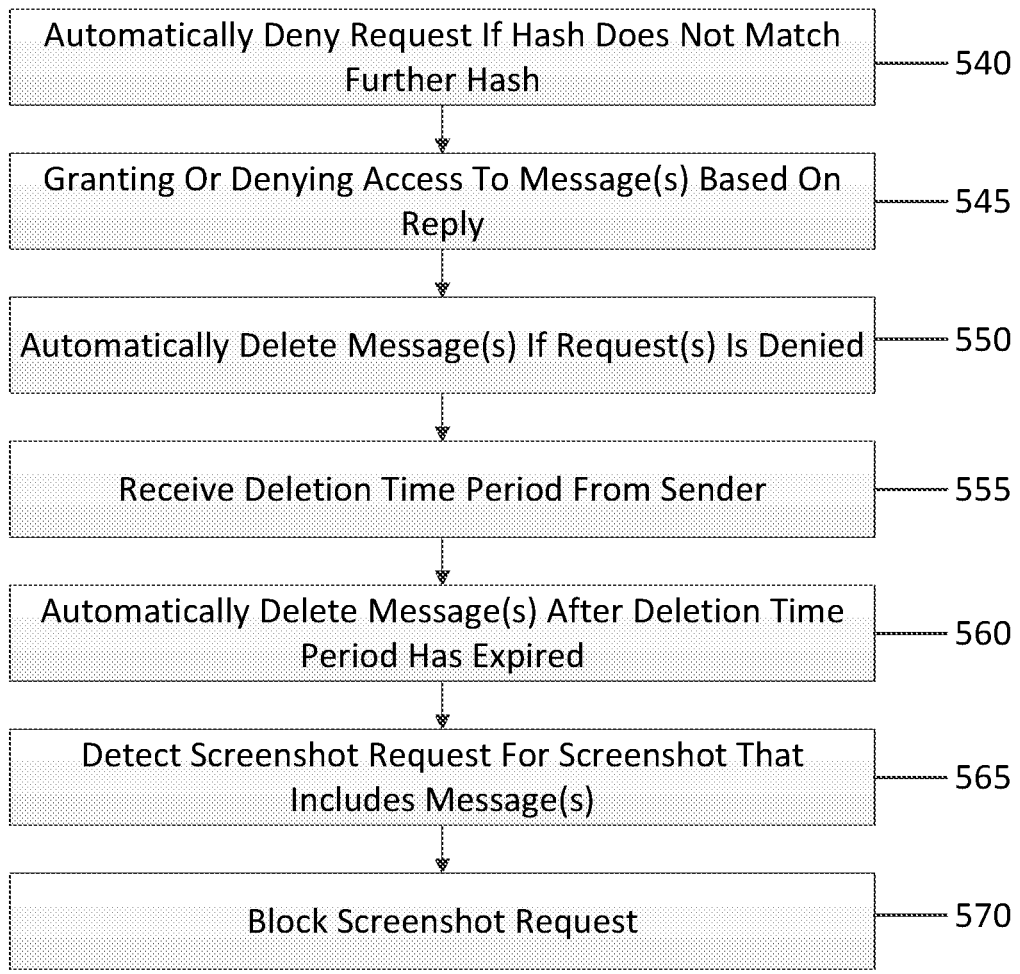

FIGS. 5A and 5B are flow diagrams of a method 500 for granting or denying access to a message within a messaging application according to an exemplary embodiment of the present disclosure. For example, at procedure 505, a message(s) can be received from a sender. At procedure 510, the message(s) can be stored in a messaging application. At procedure 515, a request(s) to read the message(s) can be received from a user associated with the messaging application. At procedure 520, the request(s) can be sent to the sender. At procedure 525, a reply(ies) can be received from the sender that includes an approval or a denial of the request(s). At procedure 530, a hash associated with the messaging application can be determined. At procedure 535, the hash can be compared to a further hash associated with an official version of the messaging application. At procedure 540, the request can be automatically denied if the hash does not match the further hash. At procedure 545, access to the message(s) can be granted or denied based on the reply. At procedure 550, the message(s) can be automatically deleted if the request(s) is denied. At procedure 555, a deletion time period can be received from the sender. At procedure 560, the message(s) can be automatically deleted after the deletion time period has expired. At procedure 565, a screenshot request for a screenshot that includes the message(s) can be detected. At procedure 570, the screenshot can be blocked based on the request.

Figure 6A:
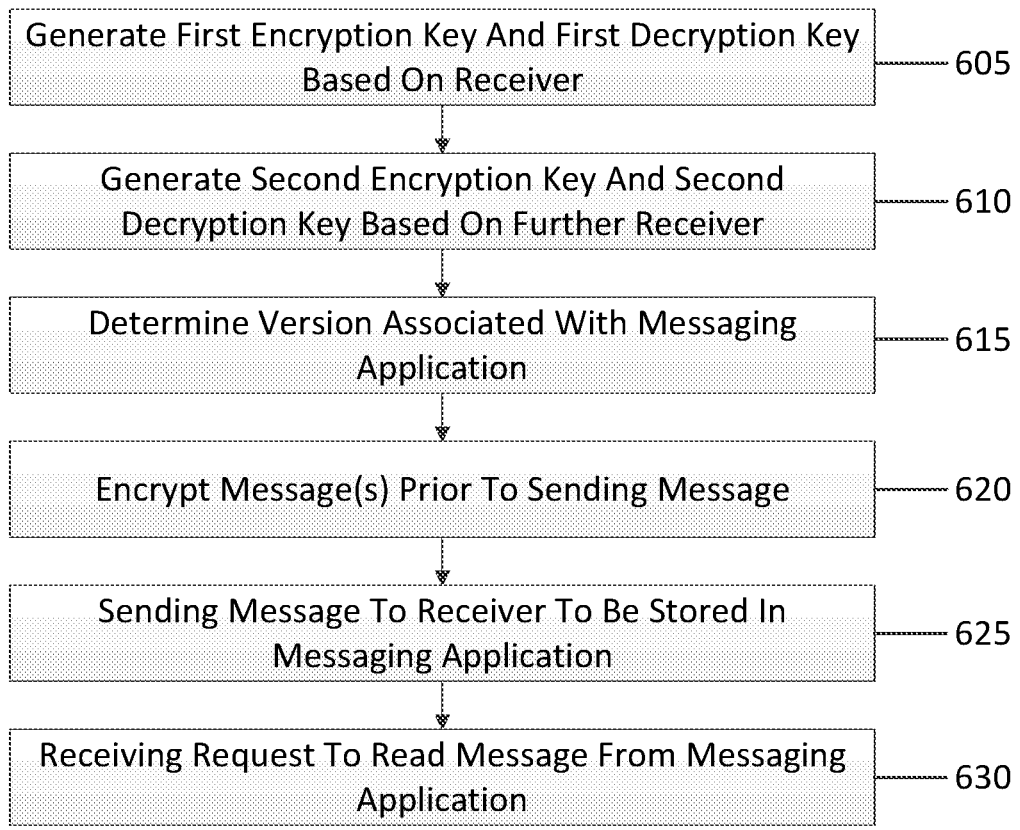
FIGS. 6A and 6B are flow diagrams of a method for granting or denying access to a message according to an exemplary embodiment of the present disclosure.
Figure 6B:

FIGS. 6A and 6B are flow diagrams of a method 600 for granting or denying access to at least one message according to an exemplary embodiment of the present disclosure. For example, at procedure 605, a first encryption key and a first decryption key can be generated based on the receiver. At procedure 610, a second encryption key and a second decryption key can be generated based on a further receiver. At procedure 615, a version associated with the messaging application can be determined. At procedure 620, the message(s) can be encrypted prior to sending the message. At procedure 625, the message can be sent to a receiver to be stored in a messaging application. At procedure 630, a request to read the message can be received from the messaging application. At procedure 635, a hash associated with the messaging application can be received. At procedure 640, the hash can be compared to a further hash associated with an official version of the messaging application. At procedure 645, a reply can be determined, which can include a grant or a denial of the request. At procedure 650, the grant or the denial including information to facilitate access to the message can be sent to the receiver. At procedure 655, a permanent access request can be received from the messaging application for permanent access to the message. At procedure 660, the permanent access request can be granted or denied.

Figure 7:
FIG. 7 is a flow diagram of a method for granting or denying access to an encrypted message within a messaging application according to an exemplary embodiment of the present disclosure.

FIG. 7 is a flow diagram of a method 700 for granting or denying access to an encrypted message within a messaging application according to an exemplary embodiment of the present disclosure. For example, at procedure 705, the encrypted message can be received from a sender. At procedure 710, the encrypted message can be stored in the messaging application. At procedure 715, a request to read the encrypted message can be received from a user associated with the messaging application. At procedure 720, the request can be sent to the sender. At procedure 725, a reply can be received from the sender that includes an approval of the request and a decryption key or a denial of the request. At procedure 730, the encrypted message can be decrypted using the decryption key if the reply is the approval or automatically deleting the encrypted message if the reply is the denial.

Figure 8:
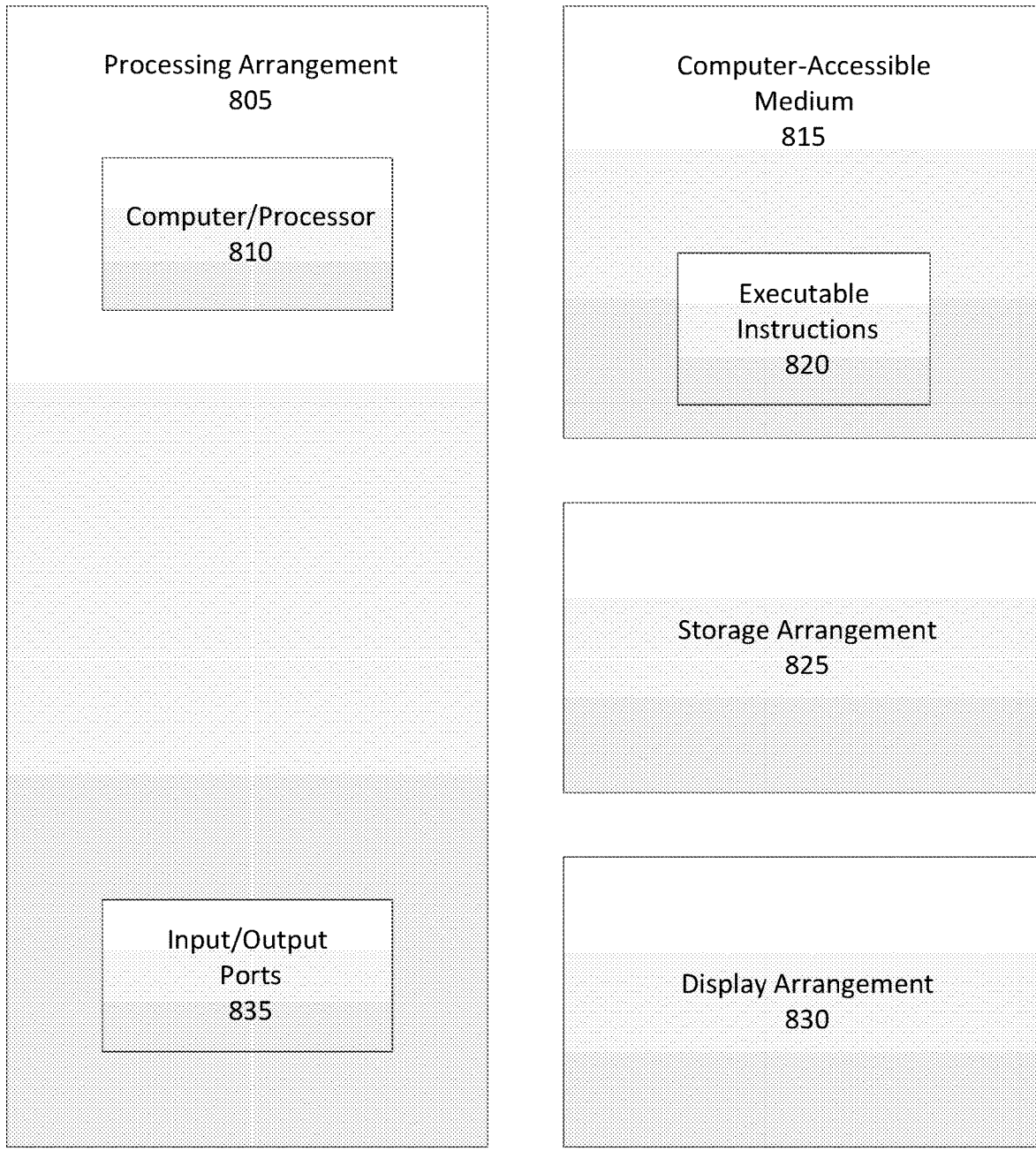
FIG. 8 is an illustration of an exemplary block diagram of an exemplary system in accordance with certain exemplary embodiments of the present disclosure.

FIG. 8 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 805. Such processing/computing arrangement 805 can be, for example entirely or a part of, or include, but not limited to, a computer/processor 810 that can include, for example one or more microprocessors, and use instructions stored on a computer-accessible medium (e.g., RAM, ROM, hard drive, or other storage device).

As shown in FIG. 8, for example a computer-accessible medium 815 (e.g., as described herein above, a transitory or non-transitory, storage device such as a hard disk, floppy disk, memory stick, CD-ROM, RAM, ROM, etc., or a collection thereof) can be provided (e.g., in communication with the processing arrangement 805). The computer-accessible medium 815 can contain executable instructions 820 thereon. In addition or alternatively, a storage arrangement 825 can be provided separately from the computer-accessible medium 815, which can provide the instructions to the processing arrangement 805 so as to configure the processing arrangement to execute certain exemplary procedures, processes, and methods, as described herein above, for example.

Further, the exemplary processing arrangement 805 can be provided with or include an input/output ports 835, which can include, for example a wired network, a wireless network, the internet, an intranet, a data collection probe, a sensor, etc. As shown in FIG. 8, the exemplary processing arrangement 805 can be in communication with an exemplary display arrangement 830, which, according to certain exemplary embodiments of the present disclosure, can be a touch-screen configured for inputting information to the processing arrangement in addition to outputting information from the processing arrangement, for example. Further, the exemplary display arrangement 830 and/or a storage arrangement 825 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for granting or denying access to at least one encrypted message within a messaging application, wherein, when a computer arrangement executes the instructions, the computer arrangement performs procedures comprising:
   receiving, from a receiver associated with the messaging application, at least one request to read the at least one encrypted message;
   decrypting the at least one encrypted message using a decryption key, the decryption key being received from a sender who sent the at least one encrypted message;
   detecting a screenshot request for a screenshot that includes the at least one encrypted message;
   upon detecting the screenshot request, determining a hash associated with the messaging application;
   comparing the hash to a further hash of an official version of the messaging application, wherein the official version of the message application corresponds to a version of the messaging application installed on the computer arrangement; and
   blocking the screenshot request if the hash does not match the further hash.

2. The computer-accessible medium of claim 1, wherein the at least one encrypted message that has been encrypted using at least one of (i) at least one public key or (ii) at least one secret key.

3. The computer-accessible medium of claim 1, wherein the procedure further comprises:
   receiving the at least one encrypted message from a sender; and
   sending the at least one request to the sender.

4. The computer-accessible medium of claim 3, wherein the procedure further comprises:
   receiving a reply from the sender that includes an approval or a denial of the at least one request; and
   granting or denying access to the at least one encrypted message based on the reply.

5. The computer-accessible medium of claim 4, wherein the decryption key is included in the reply.

6. The computer-accessible medium of claim 1, wherein the at least one encrypted message includes a group of messages, and the group of messages is associated with a single decryption key that can be used to decrypt all of the messages in the group.

7. The computer-accessible medium of claim 1, wherein (i) the at least one encrypted message includes a plurality of messages each having its own decryption key, and (ii) the at least one request includes a plurality of requests.

8. The computer-accessible medium of claim 7, wherein the procedure further comprises:
   sending the plurality of requests to the sender;
   receiving the reply, wherein the reply includes a separate approval or denial for each of the plurality of requests; and
   separately granting or denying access to each of the plurality of messages based on the reply.

9. The computer-accessible medium of claim 1, wherein the procedure further comprises automatically deleting the at least one encrypted message if the at least one request is denied.

10. The computer-accessible medium of claim 1, wherein the procedure further comprises:
    receiving a deletion time period from the sender; and
    automatically deleting the at least one encrypted message after the deletion time period has expired.

11. The computer-accessible medium of claim 1, wherein the procedure further comprises storing the at least one encrypted message in the messaging application.

12. The computer-accessible medium of claim 1, wherein the procedure further comprises automatically denying the at least one request if the hash does not match the further hash.

13. A non-transitory computer-accessible medium having stored thereon computer-executable instructions for granting or denying access to at least one message, wherein, when a computer arrangement executes the instructions, the computer arrangement is configured to perform procedures comprising:
    encrypting the at least one message to generate at least one encrypted message;
    receiving, from a receiver associated with the messaging application, at least one request to read the at least one encrypted message;
    sending, from a sender who sent the at least one encrypted message to the receiver, a grant or a denial including information to facilitate access to the at least one encrypted message;
    receiving, from the receiver, a screenshot request for a screenshot that includes the at least one encrypted message;
    receiving, from the receiver, a hash associated with the messaging application;
    comparing the hash to a further hash of an official version of the messaging application, wherein the official version of the message application corresponds to the version of the messaging application installed on the computer arrangement; and
    blocking the screenshot request if the hash does not match the further hash.

14. The computer-accessible medium of claim 13, wherein the information includes a decryption key used to decrypt the at least one encrypted message.

15. The computer-accessible medium of claim 13, wherein the at least one encrypted message includes a group of encrypted messages encrypted using a single decryption key.

16. The computer-accessible medium of claim 13, wherein the procedure further comprises:
    receiving a permanent access request from the messaging application for permanent access to the at least one encrypted message; and
    granting or denying the permanent access request.

17. The computer-accessible medium of claim 13, wherein the procedure further comprises:
    generating a first encryption key and a first decryption key based on the receiver and encrypt all messages sent to the receiver using the first encryption key; and
    generating a second encryption key and a second decryption key based on a further receiver and encrypt all messages sent to the further receiver using the second encryption key,
    wherein the first encryption key is different than the second encryption key and the first decryption key is different than the second decryption key.

18. The computer-accessible medium of claim 13, wherein the procedure further comprises determining a version associated with the messaging application, and encrypting the at least one message based on the version.

19. The computer-accessible medium of claim 13, wherein the procedure further comprises:
    receiving an expiration time from a user associated with a device storing the computer-accessible medium; and
    automatically denying the at least one request if the expiration time has expired.

20. A non-transitory computer-accessible medium having stored thereon computer-executable instructions for granting or denying access to at least one encrypted message within a messaging application, wherein, when a computer arrangement executes the instructions, the computer arrangement is configured to perform procedures comprising:
    receiving the at least one encrypted message from a sender;
    receiving, from a receiver associated with the messaging application, at least one request to read the at least one encrypted message;
    receiving a reply from the sender that includes an approval of granting or a denial of denying access to the at least one encrypted message;
    detecting a screenshot request for a screenshot that includes the at least one encrypted message;
    upon detecting the screenshot request, determining a hash associated with the messaging application;
    comparing the hash to a further hash of an official version of the messaging application, wherein the official version of the message application corresponds to a version of the messaging application installed on the computer arrangement; and
    blocking the screenshot request if the hash does not match the further hash.

\* \* \* \* \*